Nov. 9, 1965 W. J. NELLEN 3,216,920

ELECTRODIALYSIS STACK DESIGN

Filed Nov. 28, 1960 5 Sheets-Sheet 1

INVENTOR.
WILLIAM JOSEPH NELLEN

BY William A. Drucker

ATTORNEY

Nov. 9, 1965 W. J. NELLEN 3,216,920

ELECTRODIALYSIS STACK DESIGN

Filed Nov. 28, 1960 5 Sheets-Sheet 2

INVENTOR.
WILLIAM JOSEPH NELLEN

BY William M. Yanuška

ATTORNEY.

Nov. 9, 1965 W. J. NELLEN 3,216,920

ELECTRODIALYSIS STACK DESIGN

Filed Nov. 28, 1960 5 Sheets-Sheet 3

INVENTOR.
WILLIAM JOSEPH NELLEN

BY William A. Drucker

ATTORNEY.

INVENTOR.
WILLIAM JOSEPH NELLEN
BY
William A. [signature]
ATTORNEY.

Nov. 9, 1965 W. J. NELLEN 3,216,920

ELECTRODIALYSIS STACK DESIGN

Filed Nov. 28, 1960 5 Sheets-Sheet 5

*INVENTOR.*
WILLIAM JOSEPH NELLEN

*BY*

William A. [signature]

ATTORNEY.

United States Patent Office 3,216,920
Patented Nov. 9, 1965

3,216,920

ELECTRODIALYSIS STACK DESIGN

William Joseph Nellen, Greenwich, Conn., assignor to American Machine & Foundry Company, a corporation of New Jersey Filed Nov. 28, 1960, Ser. No. 72,196
9 Claims. (Cl. 204—301)

This invention relates in general to fluid treatment devices and, more particularly, to dialysis and electrodialysis apparatus.

While electrodialysis apparatus will be shown and described, it is to be understood that this invention may be equally well applied to dialysis apparatus.

An object of this invention is to provide an electrodialysis stack in which shrinking, stretching, or other distortion of its membranes will have no effect.

Another object of this invention is to provide an electrodialysis stack in which the utilized areas of the membranes are increased and only smaller areas of the membranes need to be gasketed.

Yet another object of this invention is to provide an electrodialysis stack in which polarization at the interfaces of the membrane surfaces is less likely to occur.

Still another object of this invention is to provide an electrodialysis stack in which high solution velocities occur in those sections where such high velocities reduce polarization at the interfaces of the membrane surfaces.

An additional object of this invention is to provide an electrodialysis stack in which air-binding is less likely and from which air can be more easily flushed out.

A further object of this invention is to provide an electrodialysis stack which may be more easily constructed from more simply fabricated parts at a lower cost.

A still further object of this invention is to provide an electrodialysis stack which is particularly adapted to being operated at higher water pressures, such as city water pressures ranging from 60 to 100 lbs. per square inch, without the possibility of rupturing membranes due to pressure differentials between adjacent electrodialysis cells.

Yet a further object of this invention is to provide an electrodialysis stack which may be assembled using identical gaskets.

Many other objects, advantages and features of invention reside in the construction, arrangement, and combination of parts involved in the embodiments of the invention and its practice as will be understood from the following description and accompanying drawings wherein.

Figure 2:
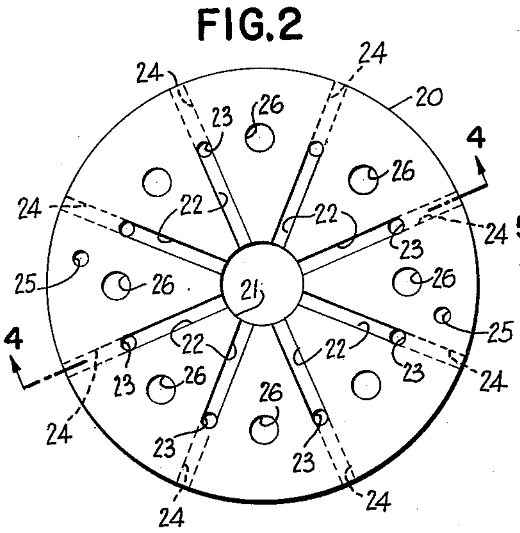
FIG. 2 is a plan view of a first type of gasket used in a first embodiment of this invention.
Figure 3:
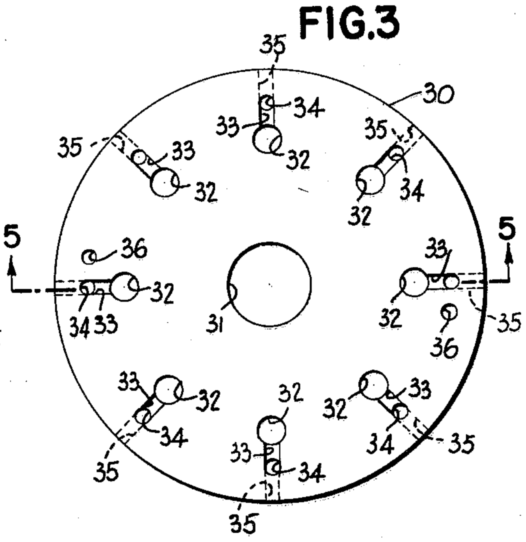
FIG. 3 is a plan view of a second type of gasket used in the first embodiment of this invention.
Figures 4, 5:
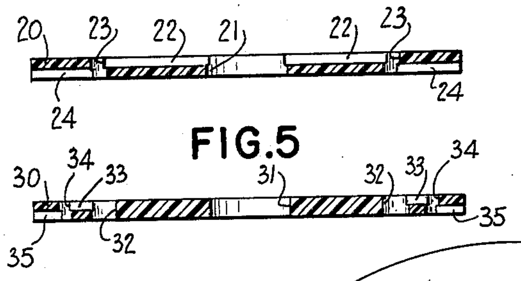
FIG. 4 is a section taken on line 4—4 of FIG. 2.
FIG. 5 is a section taken on line 5—5 of FIG. 3.

Referring now to FIGS. 2, 3, 4, 5, 6, 7, 8, 9 and 13, the first embodiment of this invention is formed and assembled in the following manner. As shown in FIGS. 2 and 4, a disk 20 is fabricated from a suitable plastic material and contains the large central aperture 21. Extending radially outward from the large central aperture 21 are the grooves 22 which are formed in the top surface of the disks 20. The outwardly disposed ends of the grooves 22 terminate in the apertures 23 which extend through the disks 20. Grooves 24 are formed in the bottom surface of disk 20 and extend from the apertures 23 to the periphery of the disk 20. Therefore, when a gasket 20 is held tightly between two membranes, fluid may flow through the grooves 24, the apertures 23, and the grooves 22 from the periphery of the gaskets 20 into their central apertures 21. Spaced outward about the central aperture 21 in each gasket 20 are the fluid flow apertures 26 which are located between the apertures 23. Alignment apertures 25 are formed in the gaskets 20 to assist in their assembly as will be described.

As shown in FIGS. 3 and 5, the second form of gasket used in the first embodiment of this invention consists of a disk 30 containing a central aperture 31 about which are spaced fluid flow apertures 32 in the disks 30. Grooves 33 extend radially outward from the fluid flow apertures 32 to terminate in the apertures 34. Grooves 35 are formed in the bottom surface of each gasket 30 to extend from the apertures 34 to the periphery of the disks 30. Thus it may be seen that, when the gaskets 30 are clamped or fixed between two membranes, fluid may flow through the grooves 35, the apertures 34, and the grooves 33 into the fluid flow apertures 32.

Figure 6:
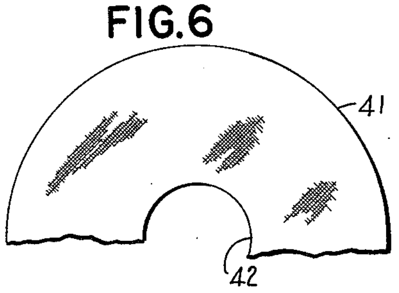
FIG. 6 is a plan view of a fragment of a membrane spacer.
Figure 7:
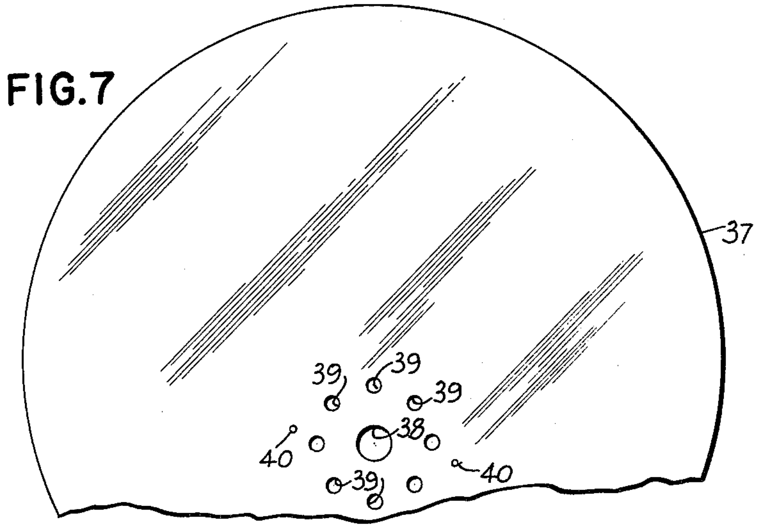
FIG. 7 is a plan view of a fragment of a membrane used in the first embodiment of this invention.
Figure 8:
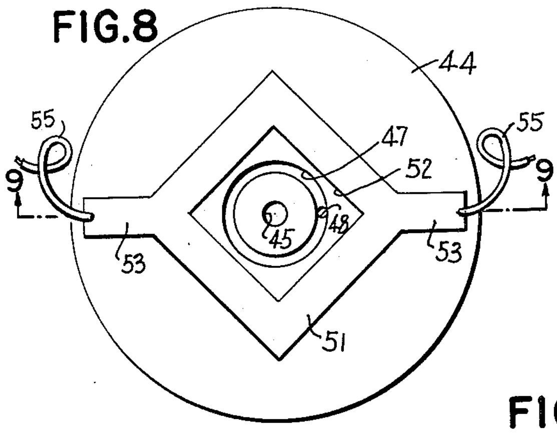
FIG. 8 is a top view of a lower end plate with an electrode shown in position on it.
Figure 9:
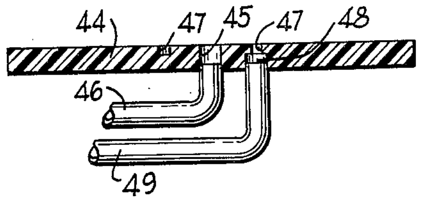
FIG. 9 is a section taken on line 9—9 of FIG. 8 with the electrode removed.
Figure 10:
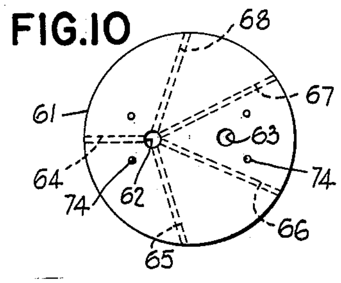
FIG. 10 is a top view of a gasket used in a second embodiment of this invention.
Figure 11:
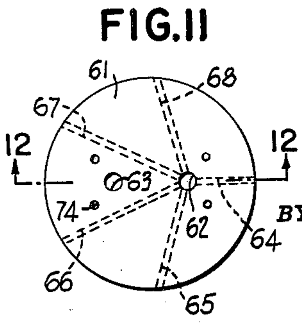
FIG. 11 is a bottom view of the gasket used in the second embodiment of this invention.
Figure 12:
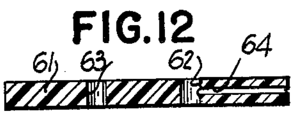
FIG. 12 is a section taken on line 12—12 of FIG. 11.

FIG. 7 shows a fragment of a membrane 37 which contains a large central aperture 38, fluid flow apertures 39 spaced about the central aperture 38, and the alignment apertures 40. FIG. 6 shows a membrane spacer element 41 which is formed from an inert screen material, a fabric material or a sheet of expanded plastic. The membrane spacers 41 are of approximately the same diameter as the membranes 37 and they contain a single large central aperture 42 which is slightly larger in diameter than the disks 20 and 30 of the first and second gaskets.

Referring now to FIGS. 1, 8, 9 and 13, an electrodialysis stack according to this invention is held between an upper end plate 43 and a lower end plate 44. The upper and lower end plates 43 and 44 may be formed from relatively thick disks of plastic or other suitable inert material. The upper and lower end plates 43 and 44 need only apply sufficient gasketing pressure on the gasket area.

In a first electrodialysis stack which may be assembled from both embodiments of this invention, the upper end plate 43 contains no fluid flow apertures while the lower end plate 44 contains a large centrally located fluid flow aperture 45 from which there extends the pipe or tubing 46 which is fixed into the aperture 45 in any suitable manner. In the top surface of the lower end plate 44 there is formed the large circular groove 47 about the opening 45. Extending through the lower end plate 44 is an aperture 48 which communicates with the bottom of the groove 47 and has fixed within it the pipe 49. On the inward facing surface of each end plate 43 and 44 there is placed one of the platinum foil electrodes 50 or 51. These electrodes may be built up from strips of platinum foil to form a square with a central opening 52 which is at least larger than the diameter of the circular groove 47. One or more projections 53 extend outward from each of the electrodes 50 or 51 so that the insulated leads 54 and 55 may be connected to them.

Figure 1:
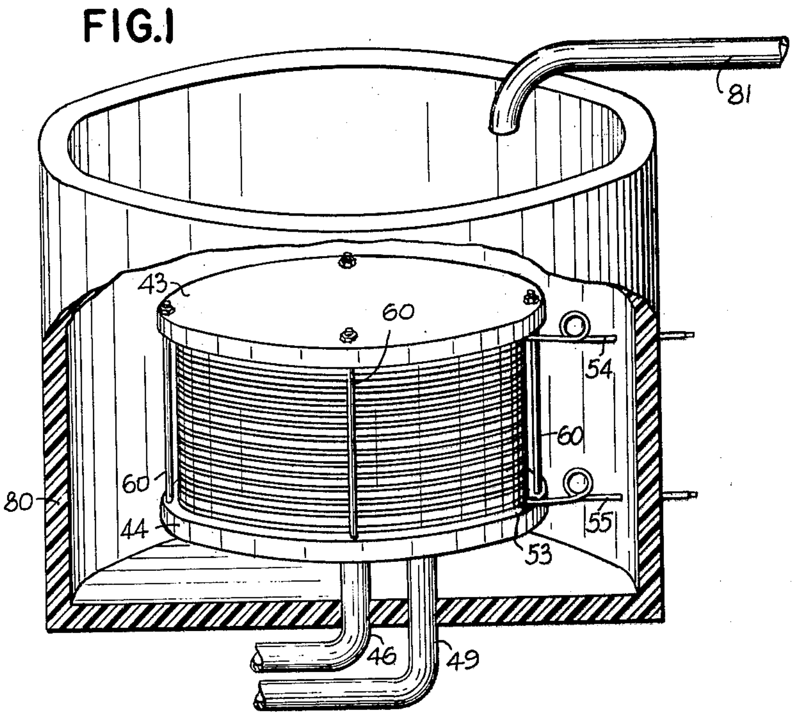
FIG. 1 is a perspective view of a tank partly broken away in section showing an electrodialysis stack according to this invention within it.
Figure 13:
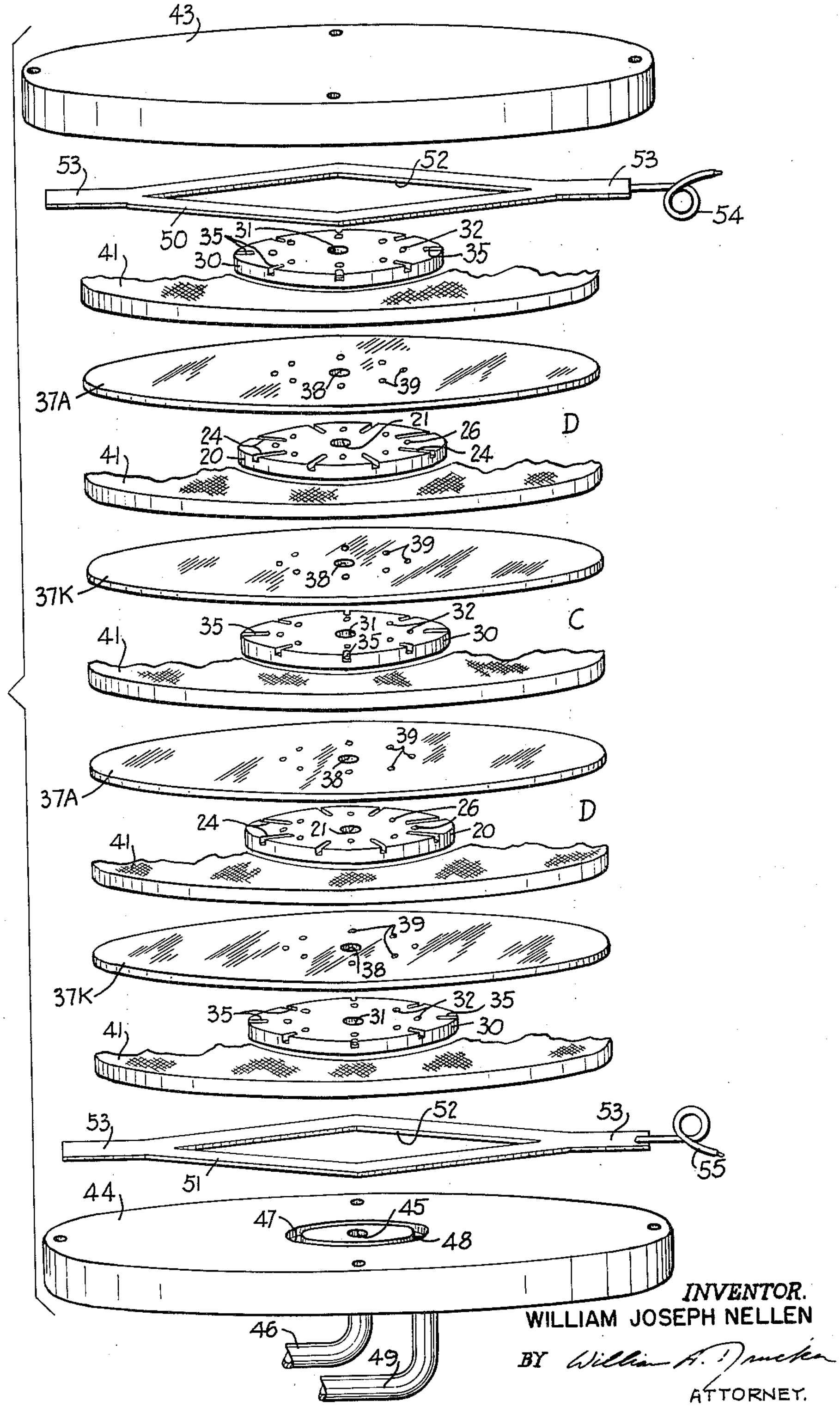
FIG. 13 is an exploded perspective view of the elements forming an electrodialysis stack according to the first embodiment of this invention.

Referring now to FIGS. 1 and 13, an electrodialysis stack may be assembled using gaskets forming a first embodiment of this invention in the following manner. The dimensions which will be ascribed to the parts are only illustrative of one example which was built and tested and these dimensions are not to be taken to limit the scope of this invention in any way. The bottom plate 44 has placed upon it a platinum foil electrode 51 which is less than $\frac{1}{1000}$ of an inch in thickness. Then a gasket 30 is placed within the opening 52 of the electrode 51 with the large central aperture 31 of the gasket 30 lying over the aperture 45 in the bottom plate 44 and with the apertures 32 in the gasket 30 communicating with the circular groove 47 in the bottom plate 44. About the gasket 30 there is placed a membrane spacer 41. Both the gasket 30 and the membrane spacer 41 are .040″ thick and the membrane spacer is sufficiently elastic to deform to accommodate the thin electrode 51.

A cation permeable membrane 37K is then placed over the screen spacer 41 and the gasket 30 with the central aperture 38 of the membrane 37K aligned with the central aperture 31 of the gasket 30 and with the fluid flow apertures 39 of the membrane 37K aligned with the fluid flow apertures 32 of the gasket 30. A gasket 20 is then placed over the membrane 37K with its central opening 21 aligned with the central opening 38 of the membrane 38K and with its fluid flow apertures 26 aligned with the fluid flow apertures 39 of the membrane 37K. A membrane spacer 41 is placed about this gasket 20 and then an anion permeable membrane 37A is placed over the gasket 20 with its central aperture 38 and its fluid flow apertures 39 aligned with the central aperture and the fluid flow apertures 26 of the gasket 20. In this manner succeeding layers of cation and anion permeable membranes 37K and 37A with interspersed gaskets 20 and 30 with their surrounding membrane spacers 41 are built up into an electrodialysis stack having a desired number of interspersed cation and anion permeable membranes.

Above the uppermost gasket 30 and its surrounding membrane spacer 41 there is placed a foil electrode 50 and the upper end plate 43. As shown in FIG. 1, the entire electrodialysis stack may be secured between the upper and lower end plates 43 and 44 by means of the bolts 60 which clamp the upper and lower end plates 43 and 44 together to firmly hold the elements of the electrodialysis stack. If suitable alignment pins (not shown) are used, an electrodialysis stack according to this invention may be rapidly assembled with the correct alignment of the central apertures and the fluid flow apertures in the membranes and the gaskets assured. If two such pins were provided to project upward from the lower end plate, they would pass through the alignment apertures 25 in the gaskets 20, the alignment apertures 36 in the gaskets 30 and the alignment apertures 40 in the membranes 37.

FIGS. 10, 11, 12 and 15 show modified gaskets and membranes which may be assembled to form an electrodialysis stack according to a second embodiment of this invention. The second embodiment of this invention uses a single gasket 61 which has two fluid flow apertures 62 and 63 formed in it. Within each gasket 61 internal transverse fluid flow passages 64, 65, 66, 67 and 68 extend from the fluid flow aperture 62 to the periphery of the gasket 61. The gaskets 61 may also contain the four alignment apertures 74.

Figure 15:
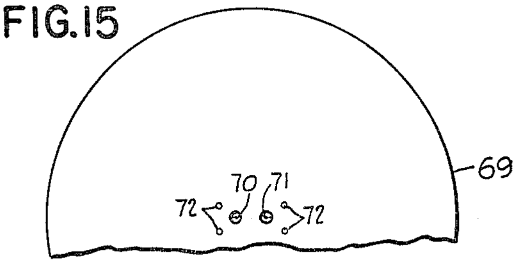
FIG. 15 is a plan view of a fragment of a membrane used in the second embodiment of this invention.
Figure 14:
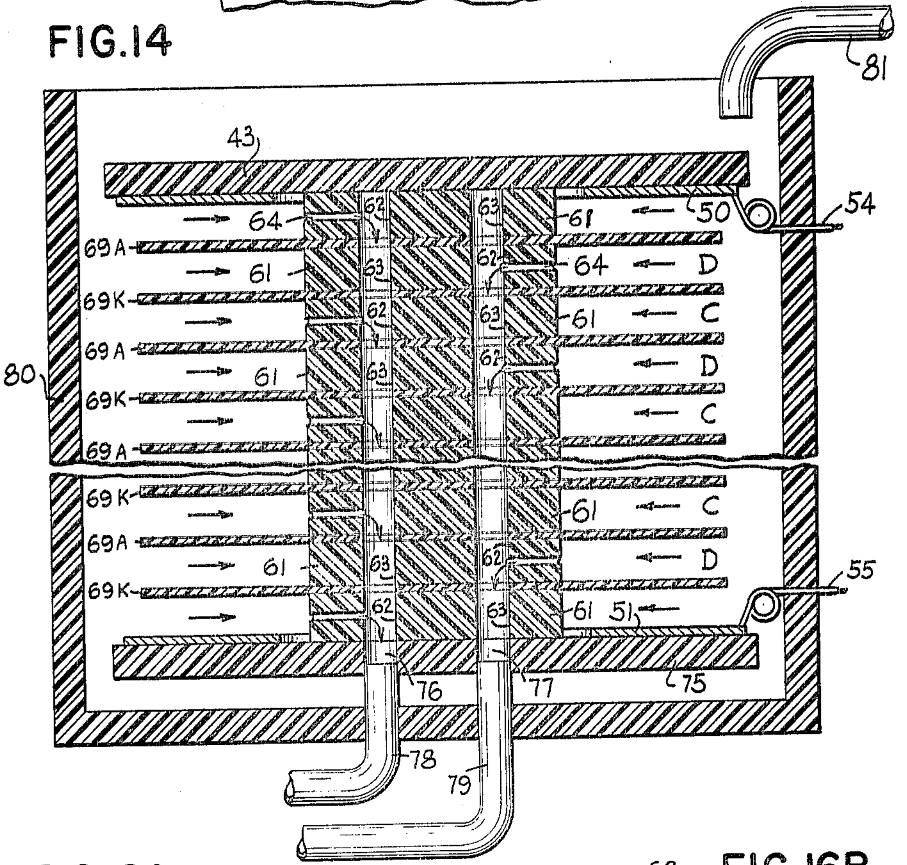
FIG. 14 is a vertical section through a tank containing an electrodialysis stack with the membrane spacers of the stack removed and with the stack assembled for a single pass of fluid through it.

Referring now to FIG. 15, the membranes 69 each contain two fluid flow apertures 70 and 71 as well as the four alignment apertures 72. Referring now to FIG. 14, an electrodialysis stack may be assembled from alternate anion and cation permeable membranes 69A and 69K and alternately inverted gaskets 61. As shown in FIG. 14, the alternately inverted gaskets 61 are disposed so that the fluid flow aperture 62 of one gasket communicates through a fluid flow aperture in an adjacent membrane to the fluid flow aperture 63 in the next gasket 61. As has been described in the first embodiment of the invention, an upper end plate 43 has an electrode 50 placed next to it. However, a slightly modified lower end plate 75 is used below the electrode 51. The lower end plate 75 contains two fluid flow apertures 76 and 77 which communicate with the fluid flow apertures 62 and 63 in the adjacent gasket 61 and which has fixed into them the pipes 78 and 79.

As shown in FIG. 14, after the entire electrodialysis stack according to the second embodiment of this invention has been assembled, it is placed within an open tank 80. The pipes 78 and 79 pass through and lead from the tank 80 and the insulated leads 53 and 54, which are connected to the electrodes 51 and 50, also lead from the tank 80. The tank 80 may then be filled with a fluid to be treated by means of an inlet pipe 81 which is connected to to suitable fluid source (not shown). When the electrodialysis stack is completely submerged under fluid filling tank 80, the leads 53 and 54 are connected to a suitable direct current source so that the electrode 50 functions as an anode and the electrode 51 functions as a cathode. At this time, the spaces between adjacent membranes 69A and 69K become alternate diluting and concentrating cells which are indicated in FIG. 14 by the letters D and C. Fluid then flows from the periphery of the diluting cells D inward toward alternate gaskets 61 to pass through their internal passages 64, 65, 66, 67 and 68 and then the fluid flows from the stack through pipe 79. In a like manner, fluid flowing through the concentrating cells C flows from their periphery inward towards alternate gaskets 61 to flow from the stack through pipe 78. At the same time, fluid flows inward from the peripheries of the electrode compartments which are adjacent to the end plates 43 and 75 to join the flow from the concentrating cells into pipe 79. As fluid drains from the tank 80 through the electrodialysis stack, the fluid level within the tank 80 may be maintained by any standard device which will cause pipe 81 to introduce additional fluid into the tank as the fluid level falls.

Since the velocity of the fluid flowing within the cells increases as it flows radially inward and since the ratio of the current density to the normality of the fluid increases as the fluid flows inward in the diluting cells, the higher flow velocity towards the center of the diluting cells gives rise to an important advantage. At a given current density for a given normality of a solution being treated, a higher flow velocity reduces polarization. Thus polarization at the membrane surfaces is reduced in this stack construction. This advantage would particularly apply in the batch operation of the stack in which only the concentrate stream was being withdrawn and the dilute stream, with a lowered normality, was being recirculated. However, in the batch operation of this invention if the dilute stream is withdrawn and the concentrate stream is recirculated, the higher velocity in the concentrating cells as fluid moves inward will tend to keep precipitates in motion as they are formed so that such precipitates can be removed by filtration as they flow from pipe 78 to be recirculated into tank 80. Naturally, two or more of these stacks may be continuously operated with their dilute or concentrating streams or both connected in series from one stack to another.

Referring again to FIG. 13, the first embodiment of this invention operates in exactly the same manner as has been described for the second embodiment. The diluting cells, which are marked D in FIG. 13, are drained through the gaskets 20 which contain passages leading to the central apertures 21. The central apertures 21 lead to the pipe 46 through the central apertures 38 in the membranes and the central apertures 31 in the gaskets 30. The flow from concentrating cells, which are designated C in FIG. 13, drains through the gaskets 30 into their fluid flow apertures 32 from which it passes through the fluid flow apertures 39 in the membranes and the fluid flow apertures 26 in the gaskets 20 to enter the groove 47 in the lower end plate and drain from the electrodialysis stack through pipe 49. Fluid flow through the electrode compartments also drains through gaskets 30 into pipe 49.

The first embodiment of this invention enjoys an advantage in that the fluid flow paths within the gaskets 20 and 30 are all of the same length and offer the same hydraulic resistance. This insures the same rate of fluid flow from each side of the gaskets 20 or 30. The second embodiment of this invention enjoys an advantage in that only a single gasket 61 need be fabricated to assemble an entire electrodialysis stack.

Figure 16A:
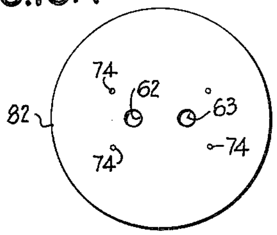
FIG. 16A is a top view of an electrode compartment gasket according to the second embodiment of this invention for use in an electrodialysis stack wherein fluid from the electrode compartments is separately drained.
Figure 16B:
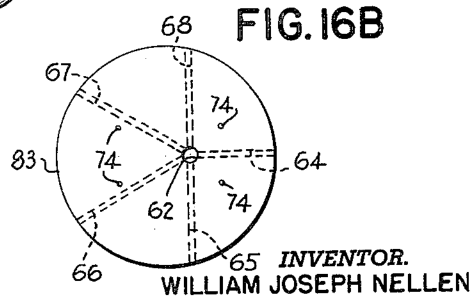
FIG. 16B is a top view of a gasket according to the second embodiment of this invention which is used in an electrodialysis stack assembled to have the product stream make two passes through it.
Figure 17:
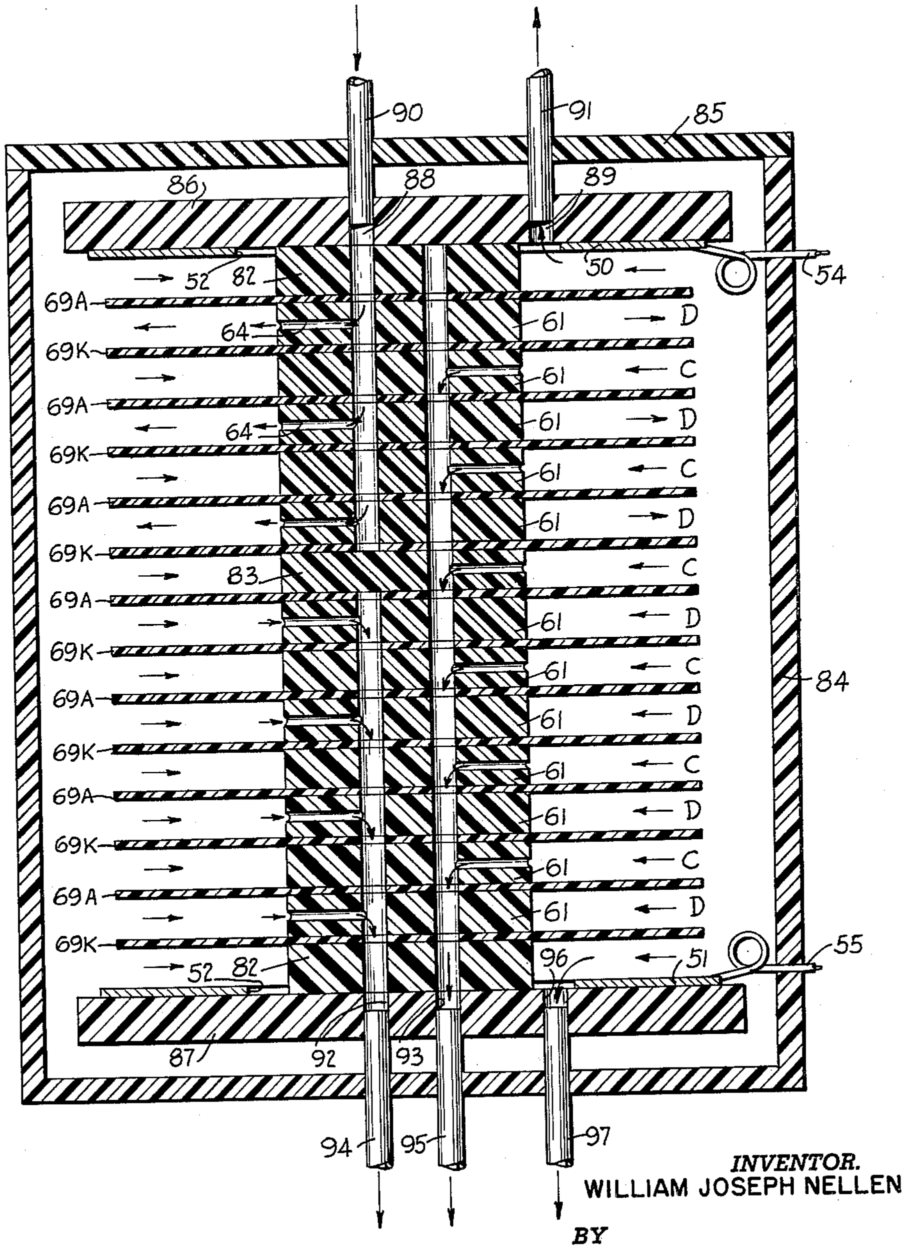
FIG. 17 is a vertical section through a tank containing an electrodialysis stack according to the second embodiment of this invention assembled so that the product stream makes two passes through it.

Referring now to FIGS. 16A, 16B and 17, a modified electrodialysis stack having internal staging to allow two passes of a product stream within the stack may be assembled using either the first or second embodiments of this invention. FIG. 16A shows a gasket 82 which contains no internal passages so that fluid from the electrode compartments of an electrodialysis stack may be separately withdrawn. Each gasket 82 contains fluid flow apertures 62 and 63 and alignment apertures 74 corresponding to those formed in the gaskets 61. FIG. 16B shows a gasket 83 which is identical to a gasket 61 except for the fact that it does not contain a fluid flow aperture 63. Referring now to FIG. 17, a tank 84 has a top 85 fixed over it and contains an electrodialysis stack according to this invention. This stack is assembled from membranes 69A and 69K interspersed between alternately inverted gaskets 61. Near the center of the stack there is placed a single gasket 83 and, at the ends of the stack, there are placed the two gaskets 82. Membrane spacers 41 may be used and the electrodes 50 and 51 are placed adjacent to the upper and lower end plates 86 and 87.

The upper end plate 86 contains an aperture 88 which is aligned with one set of the fluid flow apertures 62 or 63. A second aperture 89 extends through the upper end plate by the edge of gasket 82. The pipes 90 and 91 are fixed within the apertures 88 and 89 and extend through the cover 85 of the tank 84. The lower end plate 87 contains the two apertures 92 and 93 which are aligned with the fluid flow apertures 62 and 63 in the gaskets 61 and 82. Pipes 94 and 95 are fixed within the apertures 92 and 93 and extend through the bottom wall of the tank 84. In addition, an aperture 96 is formed through the lower end plate by the edge of a gasket 82 and has fixed within it a pipe 97 which also extends through the bottom wall of tank 84.

This modification of the invention operates as follows. Fluid to be treated is introduced into the electrodialysis stack through pipe 90. The leads 53 and 54, which extend through the side walls of tank 84, are connected to a suitable source of electric current so that electrode

50 becomes an anode and electrode 51 becomes a cathode. Thus, alternate electrodialysis cells, indicated by the letters C, become concentrating cells and the interspersed cells, indicated by the letters D, become diluting cells.

As shown in FIG. 17, fluid from pipe 90 flows through the upper end plate 86, the gasket 82, and through the internal passages 64 in the gaskets 61 into the diluting cells D. When the fluid entering the electrodialysis stack through pipe 90 reaches gasket 83, it is blocked and can no longer continue its downward path but can only escape into tank 84 through the passages in gaskets 61 communicating with diluting cells D located above the gasket 83. Meanwhile, fluid entering the tank 84 through the diluting cells D located above gasket 83 flows inward in the diluting cells D located below gasket 83. This fluid also flows inward through all the concentrating cells C in the electrodialysis stack. The concentrating cells C all drain through alternate gaskets 61 and the concentrate stream then passes from tank 84 through pipe 95. The diluting cells D, located below gasket 83, drain through the internal passages in gaskets 61 so that the dilute or product stream passes from tank 84 through pipe 94. Fliud flowing inward about anode 50 passes upward through aptrture 89 in the upper end plate 86 to pass from tank 84 through pipe 91 while fluid passing inward about the cathode 51 flows through aperture 96 in the lower end plate 87 to pass from tank 84 through pipe 97.

Thus, it may be seen that the fluid to be treated, which passes through the diluting cells D, passes outward from the center to the periphery of those diluting cells D located above gasket 83. Then a portion of this same fluid passes inward through the diluting cells D located below gasket 83 and passes from tank 84. Thus, the fluid to be treated may be directed to make two passes through the diluting cells in the electrodialysis stack if it is desired.

While fluid from the electrode compartments is shown flowing into apertures 89 and 96 in the upper and lower end plates 86 and 87, this fluid could flow into a circular groove formed in the upper and lower end plates 86 and 87 and the apertures 89 and 96 could communicate with such a circular groove. The separate drawing off of fluid from the electrode compartments may be desirable if it is desired to have the flow within the electrode compartments maintain a higher rate than in the concentrating cells so that the higher rate of flow within the electrode compartments could carry off gasses generated at the electrodes.

If a closed tank is used, such as that shown in FIG. 17, whether the product stream makes one pass through the electrodialysis cells as shown in FIG. 14 or two passes as shown in FIG. 17, one great advantage results from this invention. This electrodialysis stack may be operated more safely at city water pressures, which generally vary from 60 to 100 pounds per square inch, since the possibility of rupturing membranes due to pressure differences between the cells is minimized. Any pressure differences between adjacent cells will only cause the higher pressure cell to bulge, but since the peripheries of the membranes are not held fast and clamped as in conventional electrodialysis stacks, the membranes can move and deform under the stress without rupturing. In addition, the actual effective area of the membranes which is used is greatly increased since only a small central area of each membrane need be gasketed. Furthermore, air binding of this electrodialysis stack is less likely as air can easily escape from the open peripheries of the electrodialysis cells. However, should air binding occur, the air can easily be flushed out by reversing the flow through the stack before it is started.

As an example of the operation of this invention, an electrodialysis stack was assembled according to the first embodiment of this invention and the modification shown in FIG. 17. The stack was assembled with twenty cell pairs and the gasket 83 was placed so that there were ten diluting cells in the first pass of the fluid entering the stack and there were ten diluting cells in the second pass of the dilute stream leaving the stack. The membranes 69A and 69K were 15½ inches in diameter and the gaskets were all 3½ inches in diameter.

The stack was fed so that the product stream emerged at a rate of 21 gallons per hour. The feed water was a synthetic Texas Midland hard water containing 1190 p.p.m. of totally dissolved solids. The stack was operated for 16 hours at a current efficiency of about 65% with the resulting product stream containing 500 p.p.m. of totally dissolved solids.

While electrodialysis apparatus has been described, it is to be understood that electrodialysis is considered to be a special case of dialysis and that this invention applies equally well to dialysis devices. While the first embodiment of this invention is shown having fluid flow grooves formed in the surfaces of the gaskets and the second embodiment of the invention is shown having internal fluid flow passages, any suitable gasket construction may be used.

Although alternately disposed anion and cation permeable membranes are described in the specification, a stack according to this invention could be assembled with alternate neutral membranes. However, at least every other membrane should be ion selective.

What is claimed is:

1. An electrodialysis stack comprising, in combination, membranes, at least some of which are ion selective, containing fluid flow apertures, gaskets interspersed between said membranes, said gaskets containing fluid flow apertures aligned with the fluid flow apertures in said membranes to form at least two internal passages in said electrodialysis stack, said membranes extending outward beyond said gaskets forming electrodialysis cells between adjacent membranes whose entire surfaces are unsecured outside said gaskets, said gaskets containing transverse fluid flow channels leading from the periphery of adjacent gaskets to internal passages in said stack, electrodes disposed beyond said membranes, and fluid conducting means leading from at least two internal passages in said stack.

2. An electrodialysis apparatus comprising, in combination, a tank, means introducing fluid to be treated into said tank, and an electrodialysis stack within said tank, said electrodialysis stack having alternately disposed anion and cation permeable membranes, gaskets interspersed between said membranes, said gaskets and membranes having aligned apertures forming internal fluid passages, said membranes extending outward beyond said gaskets forming electrodialysis cells between adjacent membranes whose entire surfaces are unsecured outside said gaskets, said gaskets containing transverse fluid flow channels leading from the periphery of adjacent gaskets to internal passages in said stack, electrodes disposed beyond said membranes, and at least two fluid conducting means leading from the internal passages in said stack outside said tank.

3. The combination according to claim 2 wherein said tank is closed and wherein said means to introduce fluid to be treated into said tank introduces fluid into said closed tank under pressure.

4. The combination according to claim 2 with the addition of membrane spacers of substantially the same thickness as said gaskets disposed between adjacent membranes and disposed outside said gaskets.

5. An electrodialysis apparatus comprising, in combination, a tank, a first pipe carrying fluid to be treated into said tank, and an electrodialysis stack within said tank, said electrodialysis stack having alternately disposed anion and cation permeable membranes containing fluid flow apertures, gaskets interspersed between said membranes, said gaskets containing fluid flow apertures aligned with the fluid flow apertures in said membranes to form at least two internal passages in said electrodialysis stack, said membranes extending outward beyond said gaskets forming electrodialysis cells between adjacent membranes whose entire surfaces are unsecured outside said gaskets, said gaskets containing transverse fluid flow channels leading from the peripheries of adjacent gaskets to alternate internal passages in said stack, a second pipe communicating with one of the internal passages in said stack and leading a waste stream from one of the internal passages in said stack outside said tank, means blocking a central portion of another internal passage in said stack, said first pipe conducting fluid to be treated into said tank leading into the blocked internal passage on one side of said blocking means, a third pipe leading from the blocked internal passage on the other side of said blocking means to the outside of said tank, and electrodes disposed beyond said membranes.

6. In a dialysis stack, membranes disposed parallel to each other containing fluid flow apertures, gaskets interspersed between said membranes, said gaskets containing fluid flow apertures aligned with the fluid flow apertures in said membranes forming internal passages in said dialysis stack, said membranes extending outward beyond said gaskets forming dialysis cells between adjacent membranes whose entire surfaces are unsecured outside said gaskets, said gaskets containing transverse fluid flow channels leading from the peripheries of adjacent gaskets to different internal passages in said stack, and fluid conducting means leading from the internal passages in said stack.

7. A dialysis stack having alternately interspersed anion and cation permeable membranes containing fluid flow apertures, gaskets interspersed between said membranes, said gaskets containing at least two fluid flow apertures aligned with the fluid flow apertures in said membranes to form at least two internal passages in said dialysis stack, said membranes extending outward beyond said gaskets forming dialysis cells between adjacent membranes whose entire surfaces are unsecured outside said gaskets, said gaskets each containing transverse fluid flow channels leading from the periphery of each gasket to one of said fluid flow apertures in said gaskets with alternate gaskets being inverted so that the transverse fluid flow channels of adjacent gaskets communicate with alternate internal passages in said stack, and fluid conducting means leading from the internal passages in said stack.

8. A dialysis stack having alternately interspersed ion permeable membranes containing fluid flow apertures, first and second gaskets alternately interspersed between said membranes, each of said gaskets containing a central fluid flow aperture and outer fluid flow apertures disposed about the central fluid flow aperture, the central fluid flow apertures and the outer fluid flow apertures being aligned with the fluid flow apertures in said membranes to form a central internal passage in said dialysis stack surrounded by outer internal passages in said dialysis stack, said membranes extending beyond said gaskets forming dialysis cells between adjacent membranes, said first gaskets containing transverse fluid flow channels leading from the periphery of said first gaskets to the central fluid flow aperture in said first gaskets and said second gaskets containing transverse fluid flow channels leading from the peripheries of said second gaskets to the outer fluid flow apertures in said second gaskets, and fluid conducting means leading from the central fluid flow passage in said stack and leading from the peripheral passages in said stack.

9. An electrodialysis apparatus comprising, in combination, a tank, a first pipe carrying fluid to be treated into said tank, and an electrodialysis stack within said tank, said electrodialysis stack having two end plates, anion and cation permeable membranes disposed between said end plates, said membranes containing fluid flow apertures, end gaskets disposed beyond said membranes and adjacent to said end plates, gaskets interspersed between said membranes, said gaskets and said end gaskets containing fluid flow apertures aligned with the fluid flow apertures in said membranes to form at least two internal passages in said electrodialysis stack, said membranes extending outward beyond said gaskets forming electrodialysis cells between adjacent membranes whose entire surfaces are unsecured outside said gaskets, said gaskets containing transverse fluid flow channels leading from the peripheries of adjacent gaskets to alternate internal passages in said stack, a second pipe communicating with one of the internal passages in said stack and leading a waste stream from one of the internal passages in said stack outside said tank, means blocking a central portion of another internal passage in said stack, said first pipe conducting fluid to be treated into said tank leading into the blocked internal passage on one side of said blocking means, a third pipe leading from the blocked internal passage on the other side of said blocking means to the outside of said tank, a fourth pipe leading from the periphery of one of said end gaskets to the outside of said tank, a fifth pipe leading from the periphery of the other of said end gaskets to the outside of said tank, and electrodes disposed about said end gaskets, beyond said membranes, and between said end plates.

References Cited by the Examiner

UNITED STATES PATENTS

| | | | |
|---|---|---|---|
| 2,686,154 | 8/54 | MacNeill | 204—301 |
| 2,758,083 | 8/56 | Van Hoek et al. | 204—301 |
| 2,881,124 | 4/59 | Tye | 204—301 |
| 2,894,894 | 7/59 | Kressman | 204—301 |
| 3,005,763 | 10/61 | Kollsman | 204—301 |

WINSTON A. DOUGLAS, *Primary Examiner.*

JOHN R. SPECK, MURRAY TILLMAN, JOHN H. MACK, *Examiners.*